United States Patent [19]

Malcolm

[11] 4,081,500
[45] Mar. 28, 1978

[54] SULPHUR PELLETIZATION PROCESS

[75] Inventor: David George Malcolm, Saskatoon, Canada

[73] Assignee: The Cambrian Engineering Group Limited, Saskatoon, Canada

[21] Appl. No.: 780,447

[22] Filed: Mar. 23, 1977

Related U.S. Application Data

[63] Continuation-in-part of Ser. No. 618,487, Oct. 1, 1975, abandoned.

[30] Foreign Application Priority Data

Oct. 3, 1974 Canada ................................. 210688

[51] Int. Cl.² ............................................... B01J 2/02
[52] U.S. Cl. ......................................... 264/9; 264/14; 264/13
[58] Field of Search ........................... 264/12, 13, 14, 9

[56] References Cited

U.S. PATENT DOCUMENTS

| 3,334,159 | 8/1967 | Campbell | 264/13 |
| 3,538,200 | 11/1970 | Hite | 264/13 |
| 3,639,548 | 2/1972 | Ullman et al. | 264/12 |
| 3,769,378 | 10/1973 | Young et al. | 264/13 |

Primary Examiner—Robert F. White
Assistant Examiner—James R. Hall
Attorney, Agent, or Firm—Fleit & Jacobson

[57] ABSTRACT

Sulphur pellets are produced by spraying molten sulphur from a vortex nozzle in the form of a downwardly diverging conical sheet or jet. The sulphur impacts on the surface of cooling water in a tank. The diverging nature of the jet and the resulting turbulent swirling action promotes the formation of pellets. Control of the size, surface texture, porosity and density of the pellets can be obtained for a vortex nozzle of any particular design by varying the supply pressure or pressure drop across the nozzle and the distance between the nozzle and the water surface.

9 Claims, 2 Drawing Figures

SULPHUR PELLETIZATION PROCESS

CROSS-REFERENCE TO RELATED APPLICATION

This application is a continuation-in-part application of application Ser. No. 618,487, filed Oct. 1, 1975 now abandoned.

BACKGROUND OF THE INVENTION

This invention relates to the production of pellets of material and, more specifically, to the production of pellets of sulphur and sulphur mixtures.

A method of providing pellets of various salts, particularly those required for fertilizers, is taught in Haak's U.S. Pat. No. 1,782,038 issued Nov. 18, 1930. This patent teaches a process in which cooling liquid contained in a vessel is maintained in intense rotation by a stirrer. The molten liquid to be formed into pellets is poured onto a rotating disc from which particles are thrown off into the cooling liquid.

SUMMARY OF THE INVENTION

The method of the present invention includes flowing a fusible substance such as molten sulphur through a nozzle producing a hollow cone spray so that it emerges in a downwardly directed conical sheet or jet. This sheet is permitted to impact on the surface of a body of cooling liquid either before or after it separates into droplets under the influence of its rotation and surface tension. By varying the distance between the nozzle and the liquid surface and by varying the nozzle size and pressure drop across the nozzle control of the size and surface texture of the pellets is obtained.

This method avoids the necessity of supplying rotational energy to the cooling liquid and, due to the relative velocity between the conical sulphur sheet and the liquid, a great deal of turbulence is caused to promote pellet formation. The use of such a spray nozzle permits particulate matter to be added to the molten sulphur or other fusible substance without leading to blockage of the nozzle.

If the cooling liquid (e.g. oil, brine or pressurized water) in the tank is thermally stratified by cooling the lower portion and keeping the upper portion at a temperature above the fusion temperature of the sulphur, the liquid sulphur droplets will coalesce as they drift downwards to form larger pellets. As an alternative to stratification, the cooling liquid may simply flow countercurrent to the sulphur droplets such that an acceptable temperature gradient is achieved.

DESCRIPTION OF THE PREFERRED EMBODIMENT

Figure 1:
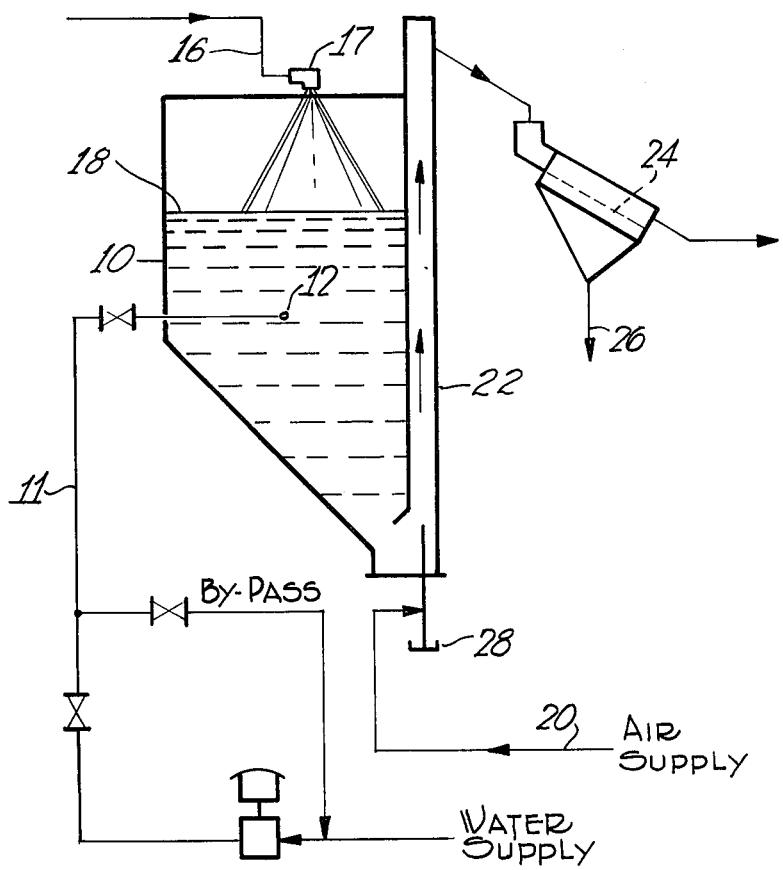
FIG. 1 is a diagrammatic view of a sulphur pelletizing plant adapted to carry out the method of this invention.
Figure 2:
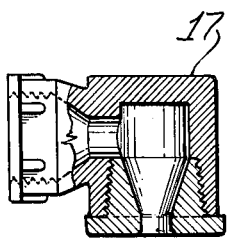
FIG. 2 is a view of the sulphur distributing nozzle.

Referring to FIG. 1, a pelletizer tank 10 contains water kept at a constant head via a line 11 and port 12. Molten sulphur supplied by a line 16 is sprayed from a nozzle 17 towards the surface of the water 18. Nozzle 17, shown in greater detail in FIG. 2, is of a vortex chamber type, such as shown in U.S. Pat. No. 3,326,473 and produces a downwardly diverging conical sheet of sulphur. The turbulent swirling action produced by impact between the rotating conical sheet, or the droplets formed therefrom, and the water aids in the production of sulphur pellets which sink to the bottom of the tank. Air injected via line 20 lifts the pellets via chute 22 to a dewatering screen 24 whence they are collected for future use. Water drained from screen 24 by line 26 and from the air injection point via line 28 may be returned to the water supply as is well known in the art. If necessary, an inert gas or vapor such as steam may be provided above the water surface to prevent oxidation of the sulphur or any other undesirable chemical reaction. A surfactant, such as one of the group of common detergents may be added to the water to improve the hardness or surface appearance of the pelletized product.

The use of a vortex chamber type of nozzle 17 has many advantages. A large number of sulphur droplets are formed concurrently when the sheet separates into droplets under the influence of its rotation and surface tension and the diverging nature of the sulphur cone keeps the droplet trajectories at some distance from one another which helps to avoid sticking or coalescing of the pellets. In pelletizing mixtures of sulphur with bentonite and metal oxides or other insoluble fertilizer materials to provide special fertilizers, this type of nozzle ensures that nozzle fouling by the particulate material is avoided.

In the preferred form of the process the vortex nozzle is operated at or near the minimum pressure required to produce a hollow cone jet. The size of the spray droplets is controlled primarily by nozzle size and supply pressure or pressure drop. The nature of the sulphur pellets produced by the process, specifically pellet size and friability, can be varied by altering the supply pressure and the distance between the vortex nozzle and the water surface. In the preferred form this distance is such that the sulphur separates into droplets under the influence of surface tension and rotational velocity prior to impact on the water. The apparatus may be operated, however, with a smaller distance between the vortex nozzle and the water surface so that a continuous sheet impinges on the water and even with the nozzle submerged in water. The process operates with the distance in the range of 0–50 inches with the preferred range being 8–20 inches. The temperature of the cooling liquid is also a variable and has especially marked effects when the conical jet impinges on the water prior to breakup. More porous and irregular sulphur pellets tend to be formed at colder water temperatures. The process operates with water temperatures in the range 40°–210° F with the preferred range being 100°–200° F. It has been found that very satisfactory results are obtained when operating with water temperature at about 160° F.

The process operates with the molten sulphur temperature in a range from the melting point (230°–246° F.) to 330° F with a preferred operating temperature of 305° F for pellets of maximum hardness. The pressure drop across the nozzle (which is equivalent to the supply pressure since there is substantially no pressure at the output) $\Delta p$ is in the range $0 < \Delta p \leq 40$ psig. Pellet size decreases with pressure and operation above 40 psig tends to produce an unacceptable amount of fines. The preferred operating pressure range is $1.0 \leq \Delta p \leq 5.0$ psig for a wide range of nozzle sizes. Increasing the distance between the nozzle and the water increases the number of smaller sized pellets.

The results of a standard tumbling test on the product of a typical preferred operation is shown in Table 1. The pellets are hard and dense with a wide gradation in size, leading to good shipping density. However, if the nozzle is near or below the surface of the water, or if the nozzle supply pressure is relatively high, the pellets which form are more friable and less dense, being somewhat like popcorn in appearance. Thus the product of the preferred operation is ideal for its freeflowing handling properties and lack of dusting, whereas the alternative friable product is ideal when high porosity or grindability are desired by the consumer. The process is unique in its adaptability to a wide range of product requirements.

TABLE 1

Standard Tumbling Test For Friability

| Sieve Size | % after 440 Tumbles | % after 920 Tumbles |
|---|---|---|
| ⅜" | 0.00 | 0.00 |
| 4 | 7.81 | 6.13 |
| 8 | 43.04 | 40.10 |
| 16 | 35.55 | 38.82 |
| 50 | 10.95 | 12.28 |
| Bottom | 2.66 | 2.67 |

This sample has bottoms percentage comparable with many other forms of pelletized sulphur. The high bulk density conforms with low friability.

Bulk Densities: 1.25 g/ml (78.06 lb/cu.ft.) Samples air dried for 24 hrs. at 23° C, relative humidity = 40%.

Operating Conditions (a) Temperature of molten sulhpur: 275° F
(b) Cooling water temperature: 90° F
(c) Level of vortex nozzle aperture above cooling water surface: 10.5 in.
(d) Vortex nozzle aperture diameter: 23/32 in.
(e) Vortex nozzle pressure drop: 1.5 psig.
(f) Sulphur flow rate: 1800 lb/hr.

The change in the distribution of pellet sizes with distance of the nozzle from the water is set out below in Table 2.

TABLE 2

| Run No. | Nozzle to H₂O Height (in.) | Water Temp (° F) | Mesh No. | Sieve Size Opening Size (mm) | % Finer Than Mesh Size |
|---|---|---|---|---|---|
| 1 | 5.5 | 100 | ⅜ | 9.51 | 100.0 |
|  |  |  | 4 | 4.76 | 68.2 |
|  |  |  | 8 | 2.38 | 17.3 |
|  |  |  | 16 | 1.19 | 4.3 |
|  |  |  | 30 | 0.595 | 1.3 |
|  |  |  | 50 | 0.297 | 0.6 |
| 2 | 8.5 | 100 | ⅜ | 9.51 | 100.0 |
|  |  |  | 4 | 4.76 | 75.2 |
|  |  |  | 8 | 2.38 | 17.9 |
|  |  |  | 16 | 1.19 | 4.8 |
|  |  |  | 30 | 0.595 | 1.2 |
|  |  |  | 50 | 0.297 | 0.4 |
| 3 | 10.5 | 85 | ⅜ | 9.51 | 100.0 |
|  |  |  | 4 | 4.76 | 82.0 |
|  |  |  | 8 | 2.38 | 23.2 |
|  |  |  | 16 | 1.19 | 6.3 |
|  |  |  | 30 | 0.595 | 1.4 |
|  |  |  | 50 | 0.297 | 0.3 |
| 4 | 12.5 | 90 | ⅜ | 9.51 | 100.0 |
|  |  |  | 4 | 4.76 | 92.2 |
|  |  |  | 8 | 2.38 | 34.8 |
|  |  |  | 16 | 1.19 | 5.9 |
|  |  |  | 30 | 0.595 | 1.2 |
|  |  |  | 50 | 0.297 | 0.2 |
| 5 | 15.5 | 90 | ⅜ | 9.51 | 100.0 |
|  |  |  | 4 | 4.76 | 96.0 |
|  |  |  | 8 | 2.38 | 45.2 |
|  |  |  | 16 | 1.19 | 12.4 |
|  |  |  | 30 | 0.595 | 2.8 |
|  |  |  | 50 | 0.297 | 0.7 |

Operating Conditions (a) Molten Sulphur Temp: 275° F
(b) Molten Sulphur Flow Rate: 1800 lb/hr.
(c) Nozzle Aperture: 23/32 in.
(d) Nozzle Pressure Drop: 1.5 psig Clearly, several variations are possible in the disclosed method without departing from the inventive concept. Specifically, it can be applied to various fusible minerals, metals, glasses or salts in addition to the disclosed preparation of sulphur pellets. If the fusible substance has a density less than that of the cooling liquid then the vortex chamber can be positioned near or at the bottom of the tank to spray upwardly with the resulting pellets being collected at the upper surface of the liquid.

I claim:

1. A process for pelletizing sulphur comprising:
   a. feeding molten sulphur at a temperature of 260°–330° F to a nozzle producing a hollow cone spray at a pressure of less than 40 psig producing a downwardly diverging hollow conical sheet of said molten sulphur; and
   b. impacting said conical sheet of molten sulphur upon the surface of a body of water having a temperature in the range 40°–210° F spaced below said nozzle producing a turbulent swirling action in said water, said sheet of molten sulphur separating into droplets which are cooled by said water to solidification to form said pellets.

2. The process of claim 1 wherein the body of water is at a temperature in the range 100°–200° F.

3. The process of claim 1 wherein the body of water is at a temperature of about 160° F.

4. The process of claim 1 wherein said nozzle is spaced from said surface of said body of water a distance in the range 0–50 inches.

5. The process of claim 4 wherein said nozzle is spaced from said surface of said body of water a distance in the range 8–20 inches.

6. The process of claim 5 wherein said nozzle is spaced from said surface of said body of water about 10 inches.

7. The process of claim 1 wherein prior to step (a) an additive selected from the group consisting of bentonite, metal oxides and insoluble fertilizer ingredients is mixed with said molten sulphur.

8. The process of claim 1 wherein there is a pressure drop across said nozzle of 1–5 psig.

9. The process of claim 1 wherein the temperature of said molten sulphur is 305° F.

* * * * *